United States Patent
Michot et al.

(10) Patent No.: US 6,670,424 B1
(45) Date of Patent: Dec. 30, 2003

(54) ROSS-LINKED SULPHONATED POLYMERS AND THEIR PREPARATION PROCESS

(75) Inventors: Christophe Michot, Grenoble (FR); Michel Armand, Grenoble (CA)

(73) Assignee: Hydro-Quebec, Quebec (CA)

(*) Notice: Subject to any disclaimer, the term of this patent is extended or adjusted under 35 U.S.C. 154(b) by 0 days.

(21) Appl. No.: 09/390,648

(22) Filed: Sep. 7, 1999

(30) Foreign Application Priority Data

Jan. 30, 1998 (CA) .............................................. 2228467
Apr. 28, 1998 (CA) .............................................. 2236197

(51) Int. Cl.[7] .................................................. C08F 8/42
(52) U.S. Cl. .............................. 525/326.3; 525/326.2; 525/367; 525/371; 525/390; 525/391; 524/544
(58) Field of Search ........................... 525/326.2, 326.3, 525/390, 391

(56) References Cited

U.S. PATENT DOCUMENTS

| | | | |
|---|---|---|---|
| 4,065,522 A | * 12/1977 | Myers et al. | 525/367 |
| 4,118,439 A | * 10/1978 | Marze | 525/128 |
| 4,468,503 A | 8/1984 | Zampini et al. | |
| 4,824,916 A | * 4/1989 | Kershner et al. | 210/500.38 |
| 4,879,338 A | 11/1989 | Mercer et al. | |
| 5,204,183 A | * 4/1993 | McDougall et al. | 424/408 |
| 5,239,010 A | * 8/1993 | Balas et al. | 525/314 |
| 5,256,181 A | * 10/1993 | Manalastas et al. | 504/101 |
| 5,414,117 A | 5/1995 | Armand et al. | |
| 5,438,082 A | 8/1995 | Helmer-Metzmann et al. | |
| 5,459,228 A | 10/1995 | Armand et al. | |
| 5,468,574 A | 11/1995 | Ehrenberg et al. | |
| 5,530,066 A | 6/1996 | Armand et al. | |
| 5,627,292 A | 5/1997 | Armand et al. | |
| 5,691,081 A | 11/1997 | Krause et al. | |
| 5,721,328 A | 2/1998 | Armand et al. | |
| 5,741,408 A | 4/1998 | Helmer-Metzmann et al. | |
| 6,090,895 A | 7/2000 | Mao et al. | |

FOREIGN PATENT DOCUMENTS

| | | |
|---|---|---|
| EP | 0 064 838 | 11/1982 |
| EP | 0 275 991 | 7/1988 |
| EP | 2749311 | 5/1997 |
| GB | 1 457 890 | 11/1973 |
| JP | 7-18073 | 1/1995 |
| WO | WO 92/17423 | 10/1992 |
| WO | WO 95/15351 | 6/1995 |
| WO | WO 97/09373 | 8/1996 |
| WO | WO 96/38754 | 12/1996 |
| WO | WO 97/19480 | 5/1997 |
| WO | WO 98/50349 | 8/1999 |
| WO | WO 99/38842 | 8/1999 |

OTHER PUBLICATIONS

Büchi, Felix N. et al., "Performance of Differently Cross–Linked, Partially Fluorinated Proton Exchange Membranes..." *J. Electrochem. Soc*, vol. 142, No. 9, Sep. 1995.

Zawodzinski, Thomas A. et al., "Determination of Water Diffusion Coefficients in Perfluorosulfonate Ionomeric Membranes", J. Phys. Chem. 1991, 95, 6040–6044.

Gutiérrez, Maritza et al., "Radical Scavenging in the Sonolysis of Aqueous Solutions...", J. Phys. Chem. 1991, 95, 6044–6047.

* cited by examiner

Primary Examiner—Bernard Lipman
(74) Attorney, Agent, or Firm—Choate, Hall & Stewart

(57) ABSTRACT

The present invention is concerned with cross-linked sulfonated polymers, eventually perfluorinated, and their preparation process. When molded in the form of membranes, the polymers are useful in electrochemical cells, in a chlorine-sodium electrolysis process, as separator in an electrochemical preparation or organic and inorganic compounds, as separators between an aqueous phase and an organic phase, or as catalyst for Diels-Alder additions, Friedel-Craft reactions, aldol concentrations, cationic polymerisation, esterification, and acetal formation.

6 Claims, No Drawings

ROSS-LINKED SULPHONATED POLYMERS AND THEIR PREPARATION PROCESS

This application claims priority under 35 U.S.C. § 120 as a continuation of PCT Application PCT/CA99/00078, filed Jan. 29, 1999.

FIELD OF INVENTION

The present invention is concerned with cationic ion-exchange resins, particularly in the form of membranes, preferably partially or completely fluorinated, their applications, in particular in electrochemical applications such as fuel cells, alkali-chloride processes, electrodialysis, ozone production, as well as any other application related to the dissociation of anionic centers linked to the membrane, such as heterogeneous catalysis in organic chemistry.

BACKGROUND OF THE INTENTION

Because of their chemical inertia, ion-exchange membranes partially or completely fluorinated are usually chosen for alkali-chloride processes or fuel cells consuming hydrogen or methanol. Such membranes are commercially available under trade names like Nafion™, Flemion™, DOW™. Other similar membranes are proposed by Ballard Inc. in application WO 97/25369 that describes copolymers of tetrafluoroethylene and perfluorovinylethers or trifluorovinylstyrene. The active monomers from which these copolymers are obtained bear chemical functions that are the precursors of ionic groups of the sulfonate or carboxylate type. Example of such precursors are:

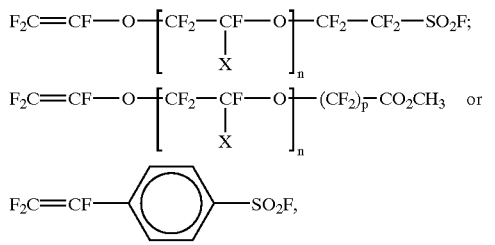

wherein

X is F, Cl or $CF_3$;

n is 0 to 10 inclusively; and p is 1 or 2.

Aromatic polymers of the polyimide or sulfonated polyether sulfone type have also been considered, for example:

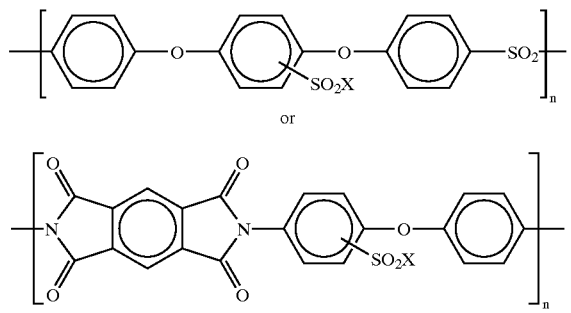

Once obtained, the copolymer containing the above precursors is molded, for example in the form of sheets, and converted into an ionic form through hydrolysis, to give species of the sulfonate or carboxylate type. The cation associated to the sulfonate and carboxylate anion include the proton, an alkali metal cation ($Li^+$, $Na^+$, $K^+$); an alkaline-earth metal cation ($Mg^{2+}$, $Ca^{2+}$, $Ba^{2+}$); a transition metal cation ($Zn^{2+}$, $Cu^{2+}$); $Al^{3+}$; $Fe^{3+}$; a rare earth cation ($Sc^{3+}$, $Y^{3+}$, $La^{3+}$); an organic cation of the "onium" type, such as oxonium, ammonium, pyridinium, guanidinium, amidinium, sulfonium, phosphonium, these organic cations being optionally substituted by one or more organic radicals; an organometallic cation such as metallocenium, arene-metallocenium, alkylsilyl, alkylgermanyl or alkyltin.

Such membranes suffer from many important disadvantages.

A) Although the copolymers forming the membrane are insoluble in their ionic form, the membrane does not have a good dimensional stability and swells significantly in water or polar solvents. These copolymers form inverted micellia only when heated at high temperatures in a specific mixture water-alcohol that, after evaporation, allows the production of a film. However, this film regenerated in the solid form does not have good mechanical properties.

B) Tetrafluoroethylene (TFE) is a hazardous product to handle, because its polymerisation is performed under pressure and can cause uncontrolled reactions, particularly in the presence of oxygen. Because of the difference of boiling points between the two monomers forming the copolymer, as well as their polarity difference, it is difficult to obtain a statistical copolymer corresponding to the addition rate of each monomer.

C) The ionic groups in high concentration on the chain have a tendency to cause solubilisation of the copolymer. To prevent this phenomenon, the concentration of ionic groups is kept fairly low by adding an important molar fraction of TFE monomers and/or by increasing the secondary chains length (n>1), with the end result that the concentration of the exchangeable ion groups are less than 1 milliequivalent per gram. Consequently, the conductivity is relatively low and highly sensitive to the water content of the membrane, particularly when the latter is acidified for applications in a fuel cell.

D) The penetration of methanol and oxygen through the membrane is high, because the perfluorocarbonated portion of the polymer allows an easy diffusion of the molecular species, which will chemically react at the opposite electrode and cause a loss of faradic efficiency, mainly in methanol fuel cells.

Non-fluorinated systems like sulfonated polyimides or sulfonated polyether sulfones have the same drawbacks because one must compromise between the charged density, and thus the conductivity, and the solubility or excessive swelling.

SUMMARY OF THE INVENTION

The present invention concerns a sulfonated polymer comprising a fraction or all the sulfonyl groups cross-linked, and wherein at least one fraction of the cross-linking bonds bear an ionic charge. More specifically, the cross-linking bonds are of the type:

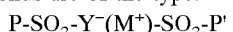
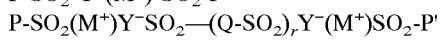

wherein

P and P' are the same or different and are part of a polymeric chain;

Y comprises N or CR wherein R comprises H, CN, F, $SO_2R^3$, $C_{1-20}$ alkyl substituted or unsubstituted; $C_{1-20}$ aryl substituted or unsubstituted; $C_{1-20}$ alkylene substituted or unsubstituted, wherein the substituent comprises one or more halogen, and wherein the chain comprises one or more substituent F, $SO_2R$, aza, oxa, thia ou dioxathia;

$R^3$ comprises F, $C_{1-20}$ alkyl substituted or unsubstituted; $C_{1-20}$ aryl substituted or unsubstituted; $C_{1-20}$ alkylene substituted or unsubstituted, wherein the substituent comprises one or more halogens;

$M^+$ comprises an inorganic or organic cation;

Q comprises a divalent radical $C_{1-20}$ alkyl, $C_{1-20}$ oxaalkyl, $C_{1-20}$ azaalkyl, $C_{1-20}$ thiaalkyl, $C_{1-20}$ aryl or $C_{1-20}$ alkylaryl, each being optionally substituted by one or more halogens, and wherein the chain comprises one or more substituents oxa, aza or thia; and r is 0 or 1.

In a preferred embodiment, M+ comprises the proton, a metal cation, an organometallic cation or an organic cation, the latter 2 optionally substituted with one or more organic radicals comprising:

a proton, an alkyl, an alkenyl, an oxaalkyl, an oxaalkenyl, an azaalkyl, an azaalkenyl, a thiaalkyl, a thiaalkenyl, a dialkylazo, a silaalkyl optionally hydrolysable, a silaalkenyl optionally hydrolysable, each being straight, branched or cyclic and comprising from I to 18 carbon atoms;

a cyclic or heterocyclic aliphatic radical comprising from 4 to 26 carbon atoms optionally comprising at least one lateral chain comprising one or more heteroatoms such is as nitrogen, oxygen or sulfur;

an aryl, an arylalkyl, an alkylaryl and an alkenylaryl of from 5 to 26 carbon atoms optionally comprising one or more heteroatoms in the aromatic nucleus or in a substituent.

The metal preferably comprises an alkaline metal, an alkaline-earth metal, a rare earth or a transition metal; the organometallic cation comprises a metallocenium, an arene-metallocenium, an alkylsilyl, an alkylgermanyl or an alkyltin, and the organic cation comprises $R"O^+$ (onium), $NR"^+$ (ammonium), $R"C(NHR")_2^+$ (amidinium), $C(NHR")_3^+$ (guanidinium), $C_5R"N^+$ (pyridinium), $C_3R"N_2^+$ (imidazolium), $C_2R"N_3^+$ (triazolium), $C_3R"N_2^+$ (imidazolinium), $SR"^+$ (sulfonium), $PR"^+$ (phosphonium), $IR"^+$ (iodonium), $(C_6R")_3C^+$ (carbonium), wherein R" is defined as an organic radical as defined above, and when an organic cation comprises at least two radicals R" other than H, these radicals can form together a cycle, aromatic or not, eventually containing the center bearing the cationing charge.

In a further preferred embodiment, the divalent radical Q and the sulfonated polymer are partially or completely fluorinated.

The present invention further comprises a process for cross-linking sulfonyl groups of a sulfonated polymer wherein at least a fraction of the cross-linking bonds bear an ionic charge, the process comprising mixing the polymer with a cross-linking agent allowing the reaction between 2 sulfonyl groups from adjacent polymeric chains, to form the said cross-linking bonds. Preferred cross-linking agents are of formula $(M^+)A_2Y^-$;
$(M^+)AY^-SO_2Y^-A(M^+)$;
$(M^+)AY^-SO_2QY^-A(M^+)$ wherein Y, Q and M are as defined above, and A comprises $Si(R')_3$, $Ge(R')_3$ or $Sn(R')_3$ wherein R' is $C_{1-18}$ alkyl.

DETAILED DESCRIPTION OF THE INVENTION

It is well known that perfluorinated polymers cannot usually be cross-linked by conventional techniques used for non-fluorinated polymers because of the easy elimination of the fluoride ion and the steric hindrance of the perfluorinated chains. However, the present invention describes a novel general technique to create cross-links, i.e, bonds, between sulfonyl groups attached to adjacent polymeric chains, including those with a perfluorinated skeleton, for example those derived from monomer (I) and its copolymers:

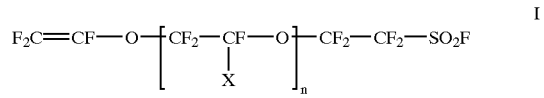

Advantageously, the cross-linking can be performed when the polymer is in the form of a non-ionic polymer precursor, but after having been molded in the desired form. The end result is therefore a material having enhanced mechanical resistance. The present invention also concerns the molding of the cross-linked polymer in the form of a membrane or hollow fibers, (hereinafter "membranes") for use in a fuel cell, a water electolyser, an alkali-chloride process, electrosynthesis, water treatment and ozone production. The use of the cross-linked polymers as catalysts for certain chemical reactions, because of the strong dissociation of the ionic groups introduced by the cross-linking technique and the insolubility of the polymeric chain, are also part of the invention.

The creation of stable cross-links is performed by a reaction between two $-SO_2Y$ groups from adjacent polymeric chains. The reaction is initiated by a cross-linking agent, and allows the formation of derivatives of the following forms:

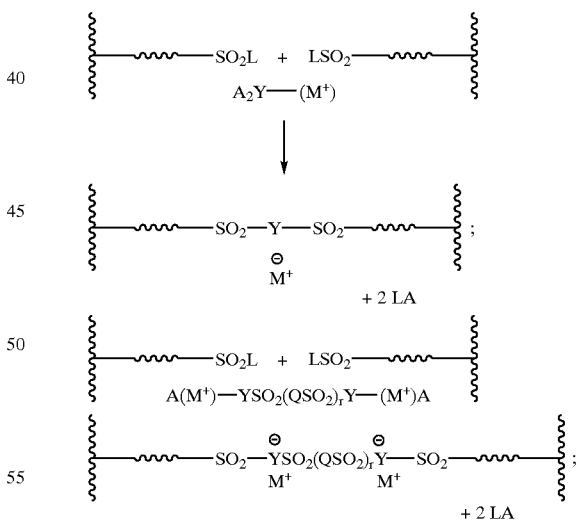

wherein r, M, Y and Q are as defined above;

A comprises M, $Si(R')_3$, $Ge(R')_3$ or $Sn(R')_3$ wherein R' is $C_{1-18}$ alkyl; and L comprises a leaving group such as a halogen (F, Cl, Br), an electrophilic heterocyclic N-imidazolyl or N-triazolyl, $R^2SO_3$ wherein $R^2$ is an organic radical as defined above.

The cation $M^+$ can itself be solvated or complexed to increase its solubility and/or its reactivity. For example, if M is a proton, the latter can be complexed with the help of a tertiary base having a strong nucleophilic character, such as triethylamine, dimethylaminopyridine, 1,4-diazabicyclo [2.2.2]octane, or in the form of a tertiobutyle radical that easily separates into a proton and $CH_2=C(CH_3)_3$. If M is a metallic ion, the latter can be solvated by dialkylethers of oligo-ethylene glycols, or methylated oligoethylenediamines.

Alternately, the cross-linking agent $A_2Y^-(M^+)$ can be formed in situ in the presence of a strong base, for example an organometallic or a metallic dialkyl amine such as diisopropylamide-lithium reacting on the leaving protons linked to the Y radical in the following manner:

$HN[Si(CH_3)_3]_2+C_4H_9Li \rightarrow C_4H_{10}+LiN[Si(CH_3)_3]_2$; $CH_2[Si(CH_3)_3]SO_2CF_3+2CH3MgClLi \rightarrow 2CH_4+(MgCl)_2C[Si(CH_3)_3]SO_2CF_3$ Preferred organometallic cross-linking agents include organo-lithium, organo-magnesium or organo-aluminium, that are also a carbon source when Y=CR, and amides and metallic nitrides as a nitrogen source when Y=N.

An advantage of the present invention is that the cross-linking agents provide negatively charged species that are bound to the sulfonyl groups of the polymers, and used as bridges between adjacent polymeric chains. It is well known that sulfonylimide groups and di- or trisulfonylmethane groups are strong electrolytes in most media, and therefore, the cross-linking reaction, in addition to improving the mechanical properties, does not have any detrimental effect on the conductivity. In fact, the latter is often increased.

The following compounds are preferred cross-linking ionogenes agents, i.e., ionic groups generators, when L is on the polymeric chain: $Li_3N$; $C_3Al_4$; $[(CH_3)_3Si]_2NLi$ (or Na or K); $NH_3+3$ DABCO; $CF_3SO_2C[(CH_3)_3Si][Li(TMEDA)]_2$; $(CH_3)_3CNH_2+3$ TEA; $NH_2SO_2NH_2+4$ TEA; $[[(CH_3)_3Si](Li)N]_2SO_2$; $[(TMEDA)(Mg)N]_2SO_2$; $CH_3Li$; $(CH_3)_3Al$; $NH_2Li$ (or Na or K); $[[Si(CH_3)_3](Li)NSO_2]_2CF_2$; $[Li[Si(CH_3)_3]NSO_2CF_2]_2CF_2$; $[(Li)Si(CH_3)_3NSO_2CF_2]$; and $[Li[Si(CH_3)_3]NSO_2CF_2CF_2]_2O$, wherein TEA=triéthylamnine; TMEDA=N,N,N'N' tetramethylethylene diamine and DABCO=1,4-diazabicyclo-[2,2,2, ]-octane.

Alternately, the cross-linking reaction can take place when the Y group is already on the precursor of the polymer, for instance in the case of a substituted amide. In such a case, the general scheme is as follows:

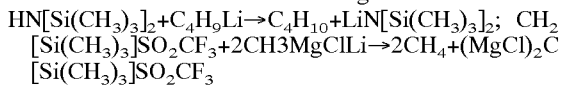

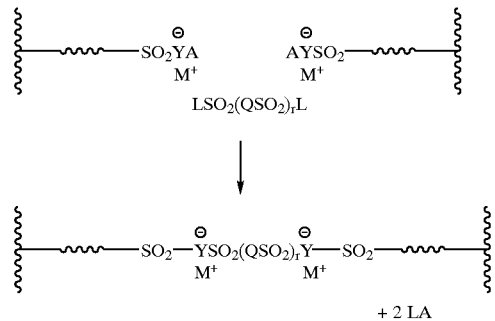

+ 2 LA

The following compounds are examples of preferred ionogene cross-linking agents when L is on the reagent: $SO_2Cl_2+3$ DABCO; $SO_2(imidazole)_2$; $[FSO_2CF_2]_2+3$ TEA; $(ClSO_2CF_2)CF_2+3$ DABCO and $(FSO_2CF_2CF_1)_2O+3$ DABCO.

The cross-linking reaction may imply all the sulfonyl groups, or only a fraction thereof. These cross-linking reagents can be added or used according to various techniques well known to those skilled in the art.

Advantageously, the polymer is molded in the desired form prior to the cross-linking, for example in the form of a membrane or a hollow fiber, and the material is immerged or covered with a solution of the cross-linking agent in one or more solvent favoring the coupling reaction. Preferred solvents are polyhalocarbons, tetrahydrofuran (THF), glymes, tertiary alkylamides such as dimethylformamide, N-methylpyrrolidone, tetramethylurea and its cyclic analogues, N-alkylimidazoles, and tetraalkylsulfarnides. The desired cross-linking degree can be controlled through various factors, such as the time of immersion in the solvent containing the cross-linking agent, the temperature of the solvent, the concentration of the cross-linking agent in the solvent, or a combination thereof. Preferably, these parameters are adjusted to produce the desired properties in a relatively short period of time varying between a few seconds to about ten hours, and the temperatures are chosen to be compatible with the usual solvents, from $-10°$ C. to $250°$ C. For comparison purposes, hydrolysis of a Nafion(D membrane takes more than 24 hours for usual thicknesses.

Alternately, a latex of the polymer to be molded is mixed preferably in the presence of fluids that are not solvents, such as ordinary or fluorinated hydrocarbons, with the solid cross-linking agent, and the mixture is heat pressed or calendered. This technique can be applied advantageously to thin membranes, and provides high productivity eventhough it is possible that the membrane be less homogeneous. Reinforcing agents such as fillers, organic or inorganic, like powders, fibers or strands woven or not, can be added to the polymers before the cross-linking reaction to reinforce the structure. Also, agents creating of porosity can be incorporated if necessary to increase the exchange surfaces with external fluids (catalytic purposes).

If only a fraction of the links bridging the polymeric chains are required, the remaining $SO_2Y$ groups can be hydrolysed conventionally in the sulfonate form by alkaline hydrolysis. Alternately, in a preferred embodiment, the sulfonate group $—SO_3^-M^+$ and the non cross-linked groups $—SO_2NSO_2R_F^-M^+$ or $—SO_2C(R)SO_2R_F^-M^+$ wherein $R_F$ comprises an organic radical preferably halogenated, particularly fluorinated, can be obtained in the same conditions as for the cross-linking reactions from non cross-linking ionogene agents such as $M[(CH_3)_3SiO]$, $M[(CH_3)_3SiNSO_2R_F]$ or $M[(CH_3)_3SiC(R)SO_2R_F]$, or any other agent capable of introducing $—NSO_2R_F$ or $C(R)SO_2R_F$ groups as a replacement for Y. It can be advantageous to treat the membrane sequentially with the cross-linking agent, and then with the non cross-linking ionogene agent. Alternately, the cross-linking agent and in the non cross-linking ionogene agent are mixed and dissolved in a solvent in predetermined concentrations, so that they can react simultaneously.

The cross-linked polymer obtained in accordance with the process of the resent invention can be easily separated from the secondary products of the reaction, that are volatile, such as $(CH_3)_3SiF$ or $(CH_3)_3SiCl$. Alternately, the cross-linked polymer can be washed with an appropriate solvent such as water or an organic solvent wherein it is insoluble. Further, conventional techniques well known to those skilled in the art, for example ion exchange or electrophoresis, can be used to change the cation $M^+$ obtained in the cross-linking reaction and/or coming from the non cross-linking ionogene agent, by the desired cation for the final application.

The following examples are provided to illustrate the invention and should not be considered as limiting its scope.

EXAMPLE 1

15 g of polyethersulfone in the powder form are sulfonated with 11 g of chlorosulfonic acid in 75 ml of 1,2-dichloroethane. The concentration of the sulfonic groups reaches 0.47 units $SO_3H$ per aromatic nucleus. $SO_3H$ groups are transformed in $SO_2Cl$ groups by adding an excess of chlorodimethylaminium chloride in DMF. The polymer in the form of a powder is filtered and washed with anhydrous acetonitrile and dried under vacuum. Under an anhydrous atmosphere, the polymer in the chlororosulfonated form is molded in the form of a film by pressing and calendering at 150° C. A film of a thickness of 50 microns is cut in squares of 4 cm sides, and immersed in a solution of 0.6 g. of the lithiated derivative of hexamethyl-disilazane $Li[N(Si(CH_3)_3)_2]$ in 50 ml of dimethylethyleneurea (DMEU). The polymer is treated in these conditions for one hour at 110° C. under dry argon atmosphere. The membrane is removed from the reaction medium, rinsed with THF and treated with an excess of lithium trimethylsilanoate (1 g) in 50 ml of 1,2-dimethoxyethane under argon for 24 hours at 25° C. The membrane is rinsed several times with distilled water, and the metallic ions are exchanged with protons in a Soxhlet extractor with a hydrochloric acid solution at an azeotropic concentration in water (i.e., 20.2% by weight). The membrane thus obtained has a conductivity greater than $10^{-3}$ $Scm^{-1}$ at 25° C and 95% relative humidity. 24% of the sulfonyl groups are engaged in the formation of imidide bridges and the membrane does not show noticeable dimensional variations in the various solvents tested, which include water, methanol, ethanol, acetonitrile and propylene carbonate.

EXAMPLE 2

A commercial membrane of Nafion 117® of 175 μm thickness in the form of a lithium salt is dried and cut in slices of 4 cm×10 cm. The membrane spiraly rolled up is treated with 2 g of sulfur dimethylaminotrifluoride $(CH_3)_2NSF_3$ in 50 ml of THF under reflux, then rinsed. The polymer now containing sulfonated groups in the form $SO_2F$ is immersed in a solution of 60 mg of the hexamethydisilazane sodium salt in 20 ml of anhydrous diglyme and refluxed under argon. After 3 hours, the membrane is removed from the reaction media, rinsed with THF and treated with a solution of 500 mg of sodium trimethysilanoate in the same solvent. After 48 hours, the membrane is washed with water and ethanol, and transformed in the hydronium salt by several successive immersions in a nitric acid solution 2 M in water at 60° C. High resolution solid NMR shows that 32% of the sulfonyl group of the membrane are in the sulfonimide form and 78% in the sulfonate form. The increase of volume of the membrane in the presence of water or methanol when immersed in these solvents, including at the boiling point, is lower than 10%.

EXAMPLE 3

A copolymer of tetrafluoroethylene in perfluorovinyloxyethane-sulfonyle fluoride containing 35% molar of the sulfonated monomer is heat calendered to form a 20 microns thick film. The compound $[Na(Si(CH_3)_3NSO_2CF_2]_2CF_2$ is prepared from the hexafluoropropane-1,3-disulfonic acid fluoride according to the following sequence of reactions:

$[FSO_2CF_2]_2CF_2 + 6\ NH_3 \rightarrow 2\ NH_4F + [(NH_4)HNSO_2CF_2]_2$
$[(NH_4)HNSO_2CF_2]_2 + Na_2CO_3 \rightarrow [(Na)HNSO_2CF_2]_2 + 2\ NH_3 + H_2O + CO_2$ $[(Na)HNSO_2CF_2]_2 + HN[(Si(CH_3)_3]_2 \rightarrow Na[Si(CH_3)_3NSO_2CF_2]_2CF_2 + NH_3$ 10 square sections of 10 cm×10 cm of this membrane separated by polypropylene wire-mesh, are immersed in a glass recipient and covered with a solution of 600 mg of the sulfamide disodic derivative in 50 ml in diglyme. The mixture is heated to 125° C. for 4 hours under argon. The membranes are then immersed in a solution of 1 g of lithium hydroxide LiOH in 50 ml of methanol, and hydrolysis of the residual $SO_2F$ functions into sulfonate groups is continued at 50° C. for 4 hours. The cross-linked membrane is washed with deionised water, and the sodium ions are exchanged with protons by nitric acid 2M. The membrane is kept under air after deionized water rinsing.

The compounds $[FSO_2CF_2]_2O$, $[FSO_2CF_2CF_2]_2O$, and $[ClSO_2CF_2]CF_2$ can similarly be substituted to the hexafluoropropane-1,3-disulfonic acid fluoride as precursors of the bridging agent.

EXAMPLE 4

A membrane of 20 μm of the copolymer of tetrafluoroethylene and perfluorovinyloxyethanesulfonyl fluoride of Example 3 is treated in a solution of 800 mg of the sulfamide disodic derivative of Example 3 and 400 mg of sodium trimethylsilanoate in 50 ml of diglyme. The mixture is heated at 125° C. for 4 hours under argon. The membrane is removed and washed with deionized water and exchanged with protons as described in Example 3.

EXAMPLE 5

A copolymer of tetrafluoroethylene and perfluorovinyloxyethanesulfonyl fluoride at 35% molar of sulfonated monomer of Example 3 is cross-linked in a similar manner by immersion in the bridging agent $[Na(Si(CH_3)_3NSO_2CF_2]_2CF_2$ in the conditions of Example 3. The membrane thus cross-linked and containing residual groups —$SO_2F$ is treated with 3 g of the sodium salt of the trifluoromethanesulfonamide derivative of formula $Na[Si(CH_3)_3NSO_2CF_3]$ in diglyme at 110° C. The membrane is rinsed and the sodium ions are exchanged with protons with nitric acid 2M. All the sulfonated functions of the membrane are in the form of bridging or free sulfonamide groups:

P—$SO_2N(H)SO_2(CF_2)_3SO_2N(H)SO_2$—P
P—$SO_2N(H)SO_2(CF_3)$ wherein P represents the polymeric chain.

EXAMPLE 6

A copolymer of tetrafluoroethylene and perfluorovinyloxyethanesulfonyl fluoride similar to that prepared in Example 3 and containing 35% of sulfonated monomer is mixed while hot with a powder of sodium chloride having a particle size lower than 2 microns and a volume fraction of 45%, and then granulated at a particle size of about 25 microns of diameter. 5 g of this composite copolymer are treated with 2 g of the hexamethyldisilazane sodic derivative in 30 ml of diglyme at 125° C. for 3 hours and the residual $SO_2F$ functions are reacted with the sodium salt of the trifluoromethanesulfonamide derivative formula $Na[Si(CH_3)_3NSO_2CF_3]$ in diglyme at 125° C. After washing with water and removal of the sodium chloride acting as a porophore, i.e, creating porosity after its elimination, the polymer presents itself in the form of granules having high specific surface area allowing a quick access to the ionic sites.

EXAMPLE 7

The compound $[CF_3SO_2C(MgCl)_2SO_2CF_2]_2CF_2$ is prepared from the hexafluoropropane-1,3-disulfonic acid fluoride according to the following reactions sequence:

$[FSO_2CF_2]_2CF_2 + 2CF_3SO_2CH_3 + 4LiH \rightarrow 2H_2 + [CF_3SO_2CH(Li)SO_2CF_2]_2CF_2$

[CF₃SO₂CH(Li)SO₂CF₂]₂CF₂+2C₄H₉Li+4 MgCl₂?

[CF₃SO₂C(MgCl)₂SO₂CF₂]₂CF₂+2C₄H₁₀+2LiCl

The sequence of reactions is performed in the same recipient ("one pot" synthesis) in the dibutylether of diethylene glycol (Ferro, USA). A membrane of a thickness of 20 microns and a size of 10 cm×10 cm prepared from the copolymer of Example 3 is immersed in a solution of 200 mg of chloromagnesium tetrasalt of tetrasulfone in 30 ml of anhydrous dibutylether of diethylene glycol. The reaction is performed under deoxygenated nitrogen at 110° C. for 6 hours. The membrane is removed from the reaction medium, rinsed with THF and hydrolysis of the residual SO₂F groups is performed as above with lithium trimethylsilanoate. The membrane is washed and exchanged with protons in the same conditions as in Example 3. The compounds [FSO₂CF₂]₂O, [FSO₂CF₂CF₂]₂O, and [ClSO₂CF₂CF₂]CF₂ can be similarly to the hexafluoropropane-1,3-disulfonic fluoride as precursors of the bridging agent.

EXAMPLE 8

A polymer of 4-trifluorovinyl-benzenesulfonyle fluoride is prepared by radicalar initiation with benzoyl peroxide in dimethylformamide. The polymer is precipitated in ether. A solution of 12% of this polymer in cyclopentanone is spread and the solvent is dried under dry air. The polymeric film obtained has a thickness of 24 microns. 100 cm² of this membrane are immersed in a mixture of 200 mg of the sodium salt of hexamethyldisilazane and 100 mg of sodium trimethylsilanoate in 10 ml of a mixture o-xylene/diglyme (50:50 v/v). The reaction medium is maintained at 80° C. for 10 hours and the side products of the reaction are eliminated by successive washings with THF, methanol and water. The ion exchange of lithium with protons gives a material having a conductivity greater than $10^{-2}$ Scm$^{-1}$ à 95% relative humidity.

EXAMPLE 9

The poly(4-trifluorovinylbenzenesulfonyl fluoride) of Example 7 is spread in the form of a solution on a polypropylene support to form a 35 micron thick film, that is subsequently cut into a membrane of 1 meter×10 cm of side. This membrane spirally rolled up with a stainless steel wire-mesh allows access to all the surface of the membrane. This assembly is placed in a 100 ml reactor to which are added 2 ml of a solution of 0.5 M ammonia in dioxanne and 700 mg de DABCO (1,4-diazabicyclo-[2,2,2, ]-octane) in 80 ml of dimethoxyethane. The reactor is closed and maintained at 115° C. for 4 hours under autogenic pressure. After cooling and restoration of ambient pressure, the membrane is separated from the reaction medium and hydrolysis of the residual SO₂F groups is performed with a solution of 5 g of caustic soda in an ethanol-water mixture (80:20 v/v). The protonic exchange is realized in the same conditions as those of Example 8.

EXAMPLE 10

10 g of a copolymer of tetrafluoroethylene and perfluorovinyloxyethanesulfonyl fluoride containing 28% molar of the sulfonate monomer obtained in the form of a latex by emulsion polymerisation in 300 mg of lithium nitride in the powder form (submicronic size) are dispersed in a blender in 50 ml of Fluorinert FC-75® (3M, USA). The suspension is spread on a stainless steel sheet of a thickness of 25 microns, and the solvent is evaporated to give a 30 microns thick film that is subsequently coated with a further stainless steel sheet. The fluorinated polymer is cross-linked by heat pressing at 100 Kg.cm$^{-2}$ and 150° C. for 1 hour. The cross-linking reaction or bridging between the —SO₂F functions is achieved according to the following equation:

$$2—SO_2F+Li_3N \rightarrow 2\ LiF+—SO_2N(Li)SO_2F—$$

After separation of the sheets, the residual SO₂F functions are hydrolyzed with an aqueous solution of lithium hydroxide, and several washings with water allow the elimination of lithium fluoride, which is a by-product of the cross-linking reaction or hydrolysis of the SO₂F groups. The membranes are exchanged with protons by several immersions in nitric acid 2M à 60° C.

The same cross-linking process can be applied by replacing lithium nitride with aluminum carbide (240 mg for 10 g) to obtain sulfone bridges.

EXAMPLE 11

A membrane of the copolymer of the tetrafluoroethylene and perfluorovinyloxyethanesulfonyl fluoride similar to that of Example 3 is immersed in a solution of 0.5 M ammonia in dioxanne and left to react for 48 hours. The SO₂F groups are transformed into —SO₂NH(NH₄) groups from which the sulfonamide is obtained by treatment with a hydrochloric acid solution, and rinsed. The sodium salt is obtained by immersion in 10% sodium carbonate solution, followed by rinsing with deionized water. The polymer is dried under vacuum, and 100 cm² of the membrane are immersed in an hexamethydilsilazane solution in acetonitrile, and refluxed for 48 hours. After separation from the reaction medium and drying, the membrane is placed in a reactor containing 100 ml of acetonitrile and 300 mg of hexafluoropropane-1,3-disulfonic acid fluoride [FSO₂CF₂]₂CF₂, and the reactor is closed and heated at 110° C. for 2 hours. After cooling, the membrane is removed and the remaining—SO₂F groups are hydrolyzed with a caustic soda solution in a mixture water-alcohol (50:50 v/v) under reflux. The sodium ions are exchanged with the protons in a manner similar to that of the preceding examples with nitric acid 2M.

In a variation, the sulfonamide functions —SO₂NH₂ are treated with an excess of dibutyl-magnesium, the membrane is rinsed in anhydrous THF and put in a solution of [FSO₂CF₂]₂CF₂ at room temperature. In both methods, the compounds [FSO₂CF₂]₂O, [FSO₂CF₂CF₂]₂ and [ClSO₂CF₂CF₂]CF₂ can be substituted to the hexafluoropropane-1,3-disulfonic acid fluoride.

EXAMPLE 12

An experimental fuel cell is made from a membrane obtained according to Example 3. A nanometric dispersion of platinum on a carbon support (Degussa) is applied on each side of the membrane through a serigraphy technique from a dispersion of platinated carbon in a colloidal solution (5% w/w) of Nafion 117® in a mixture of light alcohols (Aldrich). The system is treated at 130° C. to ensure cohesion of the Nafion® particles. The current collectors are made of grooved graphite plates to ensure the distribution of the gases. The experimental cell is tested with hydrogen and oxygen feeding at ambient pressure. The tension in open circuit is 1.2 V and the current-tension curve measured on this assembly indicates that 500 mA/cm² are obtained at a tension of 0.65 V. The replacement of platinum in the negative electrode with an alloy of platinum-ruthenium 50:50 allows the use of methanol as the fuel with a current density of 150 mA/cm² at a tension of 0.6 V. Permeation of methanol in these conditions is less than 5 μmoles/cm²·s¹.

EXAMPLE 13

An experimental fuel cell is made from a membrane obtained according to Example 9 in the form of —SO₂F precursors. The platinated carbon electrode of Example 11 is applied on each side of the membrane through serigraphy of a suspension of this material in a solution of the poly(trifluoromethylstyrenesulfonyl) fluoride in 1,2-dichloroethane. Cross-linking of the —SO$_2$F functions of the complete system is, in the same manner as in Example 7, performed by reacting a mixture of the sodic derivative of hexamethyldisilazane and sodium trimethylsilanoate in 10 ml of a mixture o-xylene/diglyme (50:50 v/v). After cross-linking, the Na$^+$ ions of the membrane and the electrodes binder are exchanged by protons with concentrated hydrochloric acid, and rinsing. The experimental fuel cell using this assembly has performances similar to those obtained for the cell described in Example 12.

EXAMPLE 14

Electrolysis of sodium chloride is performed in a cell having two compartments separated by a membrane prepared according to Example 3, the anode being of the type DSA ("dimensionally stable electrode") and made of titanium coated with a layer of ruthenium oxide RuO$_2$, in contact with the membrane, the cathode being made of nickel. The ohmic drop for 2 A/cm$^2$ is 0.4V and the permeation of OH$^-$ ions through the membrane is lower that 8.5 $\mu$moles/ cm$^2 \cdot$s$^1$.

EXAMPLE 15

The membrane prepared according to Example 4 is used for the preparation of ozone by water electrolysis on a lead dioxide anode. The cathode is a grid of platinum, both electrodes being plated on the membrane having the cathodic side immersed in water. The zone faradic yield is 20% under 4.5V.

EXAMPLE 16

The porous ion exchange resin prepared in Example 5 is used as a chemical reaction catalyst. In the active protonic formn after dehydration under vacuumn, the resin catalyses Friedel-Craft reactions, esterifications, acetalisations etc. To an equimolecular mixture of anisole and acetic anhydride are added 3% by weight of the resin in the acidic form. The formation reaction of the 4-methoxyacetophenone is completed in 45 minutes at room temperature.

The proton exchange for the transition ions and the rare earth metals, in particular La$^{+3}$ and Y$^{+3}$, provide a catalyst for the Friedel-Craft reactions and the cross-aldolisation.

To an equimolecular mixture of cyclopentadiene and vinyl-methyl ketone (10 mmoles in 30 cc of dichloromethane) are added 5% by weight of the resin in the form Y$^{+3}$ dried under vacuum at 60° C. The formation reaction of the Diels-Alder condensation compound is completed at à 25° C. in 30 minutes, the endo/exo ratio being close to 90:10.

In both cases, the catalyst is eliminated by simple filtration, and is reusable.

While the invention has been described in connection with specific embodiments thereof, it will be understood that it is capable of further modifications, and this application is intended to cover any variations, uses or adaptations of the invention following, in general, the principles of the invention, and including such departures from the present description as come within known or customary practice within the art to which the invention pertains, and as may be applied to the essential features hereinbefore set forth, and as follows in the scope of the appended claims.

What is claimed is:
1. A sulfonated polymer comprising in whole or in part cross-linked sulfonyl groups, and wherein at least a fraction of the cross-linking bonds bear an ionic charge and are of the type:

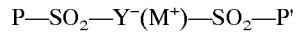
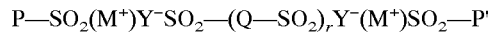

wherein

P and P' are the same or different and are part of a polymeric chain;

Y comprises N or CR wherein R comprises H, CN, F, SO$_x$R$^3$, C$_{1-20}$ alkyl substituted or unsubstituted; C$_{1-20}$ aryl substituted or unsubstituted; C$_{1-20}$ alklyene substituted or unsubstituted, wherein the substituent comprises one or more halogens, and wherein the chain may comprise one or more substituent F, SO$_2$R, aza, oxa, thia or dioxathia;

R$^3$ comprises F, C$_{1-20}$ alkyl substituted or unsubstituted; C$_{1-20}$ aryl substituted or unsubstituted; C$_{1-20}$ alklyene substituted or unsubstituted, wherein the substituent comprises one or more halogens;

M$^+$ comprises an inorganic or organic cation;

Q comprises a divalent radical C$_{1-20}$ alkyl, C$_{1-20}$ oxaalkyl, C$_{1-20}$ azaalkyl, C$_{1-20}$ thiaalkyl, C$_{1-20}$ aryl or C$_{1-20}$ alkylaryl, each being optionally substituted by one or more halogens, and wherein the chain comprises one or more substituents oxa, aza or thia;

r is 0 or 1; and the sulfonated polymer is partially or completely fluorinated.

2. A polymer according to claim 1 wherein M$^+$ comprises the proton, a metal cation, an organometallic cation or an organic cation optionally substitued by one or more organic radical comprising:

a proton, an alkyl, an alkenyl, an oxaalkyl, an oxaalkenyl, an azaalkyl, an azaalkenyl, a thiaalkyl, a thiaalkenyl, a dialkylazo, a silaalkyl optionally hydrolsable, a silaalkenyl optionally hydrolysable, each being straight, branched or cyclic and comprising from 1 to 18 carbon atoms;

a cyclic or heterocyclic aliphatic radical comprising from 4 to 26 carbon atoms optionally comprising at least one lateral chain comprising one or more heteroatoms such as nitrogen, oxygen or sulfur;

an aryl, an arylalkyl, an alkylaryl and an alkenylaryl of from 5 to 26 carbon atoms optionally comprising one or more heteroatoms in the aromatic nucleus or in a substituent.

3. A polymer according to claim 1 wherein the metal comprises an alkaline metal, an alkaline-earth metal, a rare earth or a transition metal; the organic metallic cation comprises metalloceniumn, an arene-metallocenium, an alkylsilyl, an alkylgermanyl or an alkyltin, and the organic cation comprises an onium selected from the group consisting of oxonium, ammonium, amidinium, guanidinium, pyridinium, imidazolium, triazolium, imidazolinium, sulfonium, phosphonium, iodonium, and carbonium, wherein the onium comprises at least one organic radical R", and when an organic cation comprises at least two radicals R" different from H, these radicals can form together a cycle, aromatic or not, eventually containing the center bearing the cationic charge.

4. A polymer according to claim 1 wherein the divalent radical and the sulfonated polymer are partially or completely fluorinated.

5. A polymer according to claim 1 derived from at least of the following monomers:

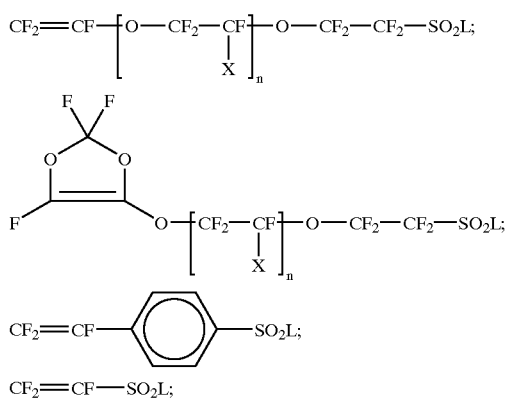

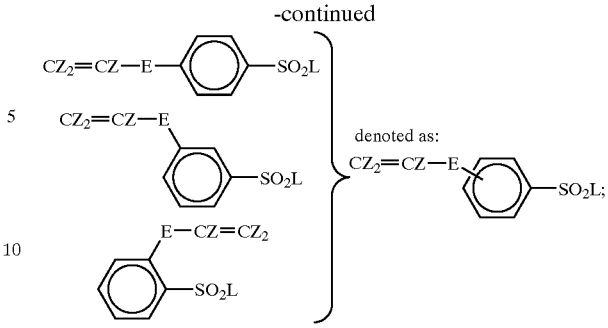

wherein
X is F, Cl or $CF_3$;
n varies between 0 and 10 inclusively;
E is absent, O, S, $SO_2$;
Z is H or F, and at least one Z is F; and
L is a leaving group.

6. A polymer according to claim 1 further comprising a reinforcing agent.

* * * * *

UNITED STATES PATENT AND TRADEMARK OFFICE
CERTIFICATE OF CORRECTION

PATENT NO. : 6,670,424 B1
DATED : December 30, 2003
INVENTOR(S) : Christophe Michot et al.

It is certified that error appears in the above-identified patent and that said Letters Patent is hereby corrected as shown below:

<u>Title page, Item [54] and Column 1, line 1,</u>
"ROSS-LINKED" should be changed to -- CROSS-LINKED --.

Signed and Sealed this

Eleventh Day of January, 2005

JON W. DUDAS
*Director of the United States Patent and Trademark Office*